Sept. 8, 1925.  1,553,149
J. H. DORAN
SHAFT BEARING
Filed Nov. 23, 1923
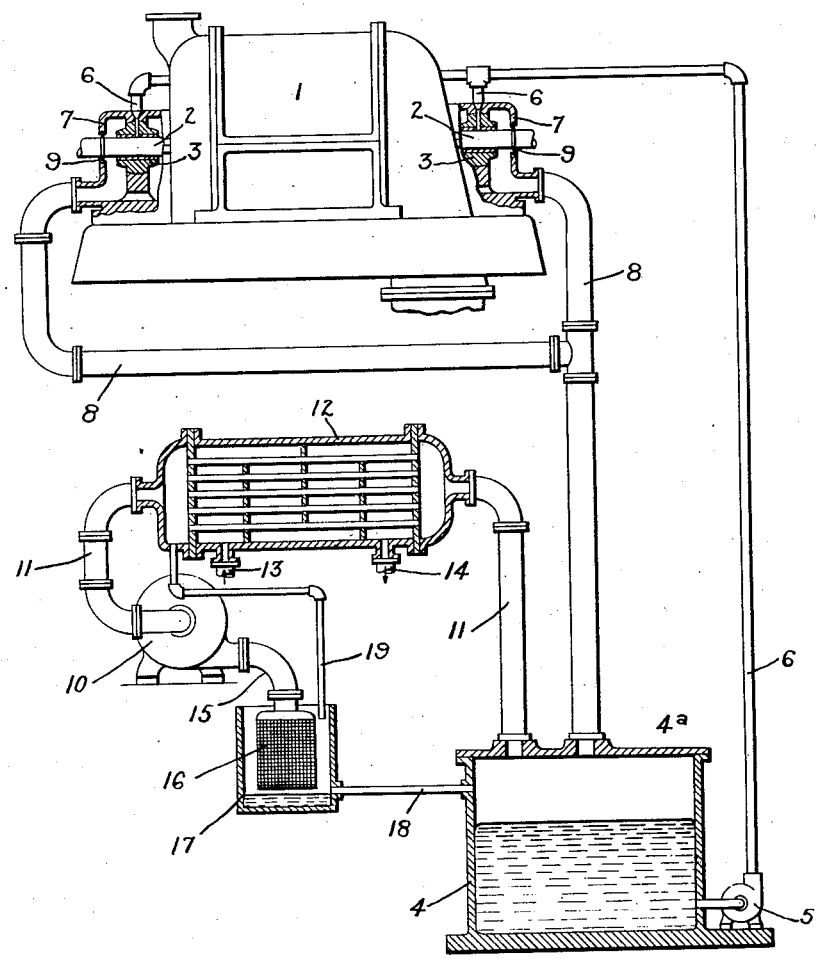
Inventor:
John H. Doran;
by *Alexander S. [signature]*
His Attorney.

Patented Sept. 8, 1925.

1,553,149

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

SHAFT BEARING.

Application filed November 23, 1923. Serial No. 676,664.

*To all whom it may concern:*

Be it known that I, JOHN H. DORAN, a citizen of the United States, residing at Schenectady, in the county of Schenectady, State of New York, have invented certain new and useful Improvements in Shaft Bearings, of which the following is a specification.

The present invention relates to shaft bearings and particularly to bearings of considerable size such as are met with in connection with steam turbines, large generators and the like. Such bearings, even though they are water cooled or oil cooled become quite hot during operation with the result that more or less oil escapes from the ends of the bearings in the form of vapor or fine mist. In addition to the loss of lubricant from this cause there is the difficulty also that this vapor or mist will condense and settle on adjacent machine parts where it may not only prove unsightly but may actually do material damage. For example, in the case of a turbo-generator set, the oil vapor or mist may find its way into the generator and damage the insulation on the windings.

The object of my invention is to provide an improved arrangement in connection with shaft bearings whereby any mist or vapor escaping from the bearing will be collected and condensed, and for a consideration of what I believe to be novel and my invention, attention is directed to the accompanying description and the claim appended thereto.

In the drawing, the figure is a diagrammatic view of a construction embodying my invention.

Referring to the drawing, 1 indicates a machine provided with a shaft 2 which is carried in bearings 3. In the present instance machine 1 is shown as being an elastic fluid turbine. 4 indicates an oil tank containing a supply of lubricant, and 5 a pump which may be suitably operated from the turbine shaft for example, and supplies lubricant through conduits 6 to bearings 3. Tank 4 is provided with a tight cover plate 4$^a$ which serves to seal the tank making it substantially air tight. Each of the bearings 3 is enclosed in a housing 7 and these housings are connected by conduits 8 to oil tank 4. At the points where shaft 2 passes through the walls of housings 7 are suitable clearances and in such clearance spaces are arranged suitable baffling devices or packings 9. At 10 is indicated an air pump, for example a suitable centrifugal pump, having its suction side connected by a conduit 11 to tank 4 above the level of the oil therein. In conduit 11 is inserted a condenser 12 here shown as being of the surface type. The inlet and outlet for the cooling medium for the condenser are indicated at 13 and 14. The discharge side of the pump 10 is connected by a conduit 15 to a discharge head 16 located in a casing 17, and connecting casing 17 to tank 4 is a pipe 18. Discharge head 16 may with advantage embody a number of screens through which the oil mist or vapor is discharged, such screens serving to catch the oil particles. The condenser head at the discharge side of condenser 12 is connected by a drip pipe 19 to casing 17. Pump 10 may be driven in any suitable manner. For example, it may be motor driven or driven from the turbine shaft.

In operation pump 5 supplies lubricant to the bearings in the usual manner and after passing through the bearings it flows into housings 7 and back to tank 4 by way of conduits 8. At the same time pump 10 is operated to maintain a circulation of air from the surrounding atmosphere past packings 9 into housings 7 and thence through conduits 8 to tank 4 above the level of the liquid therein. The air in flowing through housings 7 and conduits 8 will carry with it any oil vapor or mist in the housings, conveying the same to tank 4. A part of the oil vapor or mist will be condensed during its passage into tank 4 and will be deposited therein. Any remaining vapor or mist will pass along with the air through conduit 11 and condenser 12 and being cooled therein, will condense and deposit in the head at the discharge side of the condenser from whence it will flow through pipe 19 to casing 17 or it will be carried along through pump 10 and conduit 15 to discharge head 16 where it will be deposited in casing 17, the air escaping through the openings in head 16 to atmosphere. From casing 17 the oil accumulating therein flows through pipe 18 back to the tank 4.

Viewed from another aspect, it will be seen that tank 4 is sealed and that pump 10 serves to maintain a partial vacuum in the upper portion of the tank so that there will be a flow of air through housings 7 and conduits 8 to the tank 4.

With the above described arrangement the continuous flow of air along the shaft into housings 7 prevents escape of oil vapor or mist along the shaft and causes it all to be carried to tank 4 through conduits 8.

It is of course not necessarily required that conduits 8 should lead to tank 4 and thence to pump 10 but I prefer this arrangement because by it conduits 8 perform the function not only of conveying the air and vapor or mist but also that of conveying the oil back to tank 4. By my invention I provide a simple and efficient means for preventing the escape of oil vapor or mist from bearings and for condensing and conserving the same.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is—

The combination with a shaft, a bearing, a sealed oil tank, and means for supplying lubricant from the tank to the bearing, of a housing for the bearing, a conduit connecting the housing to the upper end of the tank, an air pump, a conduit connecting the suction side of said air pump to the upper portion of said oil tank, and a condenser in said last named conduit.

In witness whereof, I have hereunto set my hand this 22nd day of November, 1923.

JOHN H. DORAN.